United States Patent [19]

Claxton et al.

[11] Patent Number: 4,893,893

[45] Date of Patent: Jan. 16, 1990

[54] STRENGTHENED BUFFERED OPTICAL FIBER

[75] Inventors: James D. Claxton, Lawrenceville; Gerald A. Scheidt, Dunwoody; Stanley C. Shores, Atlanta, all of Ga.

[73] Assignees: American Telephone and Telegraph Co., AT&T Bell Laboratories, Murray Hill; AT&T Technologies, Inc., Berkeley Heights, both of N.J.

[21] Appl. No.: 154,424

[22] Filed: Feb. 8, 1988

Related U.S. Application Data

[63] Continuation-in-part of Ser. No. 825,709, Jan. 31, 1986, abandoned.

[51] Int. Cl.$^4$ .............................................. G02B 6/44
[52] U.S. Cl. .................................................. 350/96.23
[58] Field of Search ..................................... 350/96.23

[56] References Cited

U.S. PATENT DOCUMENTS

| | | | |
|---|---|---|---|
| 4,038,489 | 7/1977 | Stenson et al. | 350/96.23 X |
| 4,172,106 | 10/1979 | Lewis | 350/96.23 |
| 4,241,979 | 12/1980 | Gagen et al. | 350/96.23 |
| 4,302,073 | 11/1981 | Bendayan et al. | 350/96.23 |
| 4,304,462 | 12/1981 | Baba et al. | 350/96.23 |
| 4,331,378 | 5/1982 | Hartig | 350/96.23 |
| 4,389,087 | 6/1983 | Bendayan | 350/96.23 |
| 4,441,787 | 1/1984 | Lichtenberger | 350/96.23 |
| 4,595,793 | 6/1986 | Arroyo et al. | 174/121 A |

FOREIGN PATENT DOCUMENTS

| | | | |
|---|---|---|---|
| 0035651 | 3/1977 | Japan | 350/96.23 |
| 0031905 | 2/1984 | Japan | 350/96.23 |
| 1568178 | 5/1980 | United Kingdom . | |
| 2086607 | 5/1982 | United Kingdom . | |
| 2096343 | 10/1982 | United Kingdom . | |

OTHER PUBLICATIONS

*Optical Spectra* article, Jul. 1976, p. 30, "Fibers in the Forefront".

P. R. Bark et al., "Cable Design, Testing and Installation", International Fiber Optics and Communications, vol. 3, No. 2, Mar.–Apr. 1982, pp. 22–23.

Lightwave, Dec. 1985 advertisement by Chromatic Technologies of Franklin, M.A.

*Primary Examiner*—John D. Lee
*Assistant Examiner*—Phan T. Heartney
*Attorney, Agent, or Firm*—Edward W. Sommers

[57] ABSTRACT

A buffer optical fiber (20) includes an optical fiber (21) comprising a core and a cladding. The optical fiber is enclosed by a plastic buffer layer (50). Interposed between the optical fiber and the buffer layer are a plurality of fibrous strands (25—25) which are strength members for the buffered optical fiber. In a preferred embodiment, the strength members are layless and as such are generally linear and parallel to a longitudinal axis of the buffered optical fiber. The buffer layer has a predetermined compressive engagement with the strength members which allows the stripability of the buffer layer from the fiber to be controlled.

16 Claims, 5 Drawing Sheets

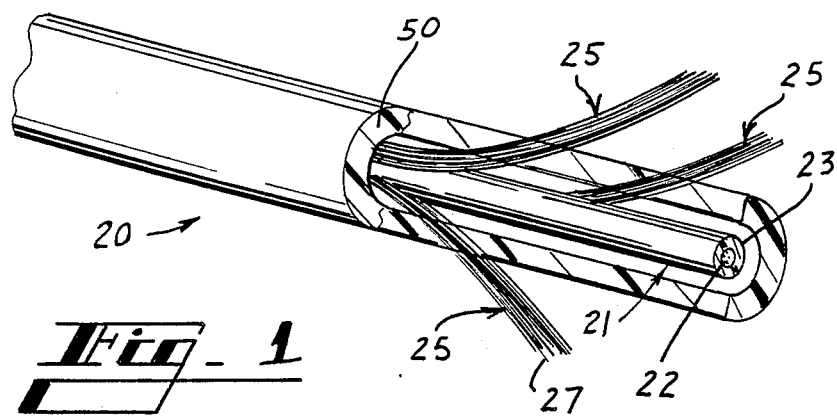
Fig_1
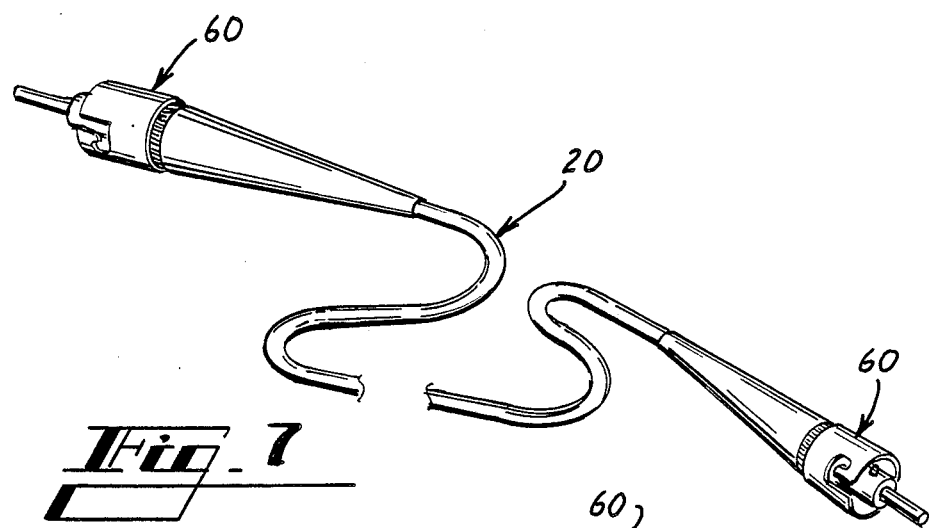
Fig_7
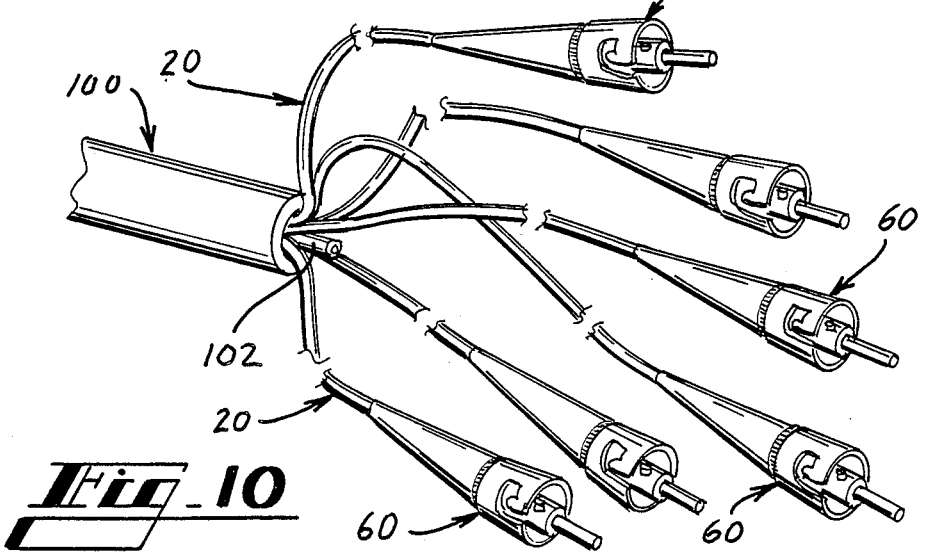
Fig_10

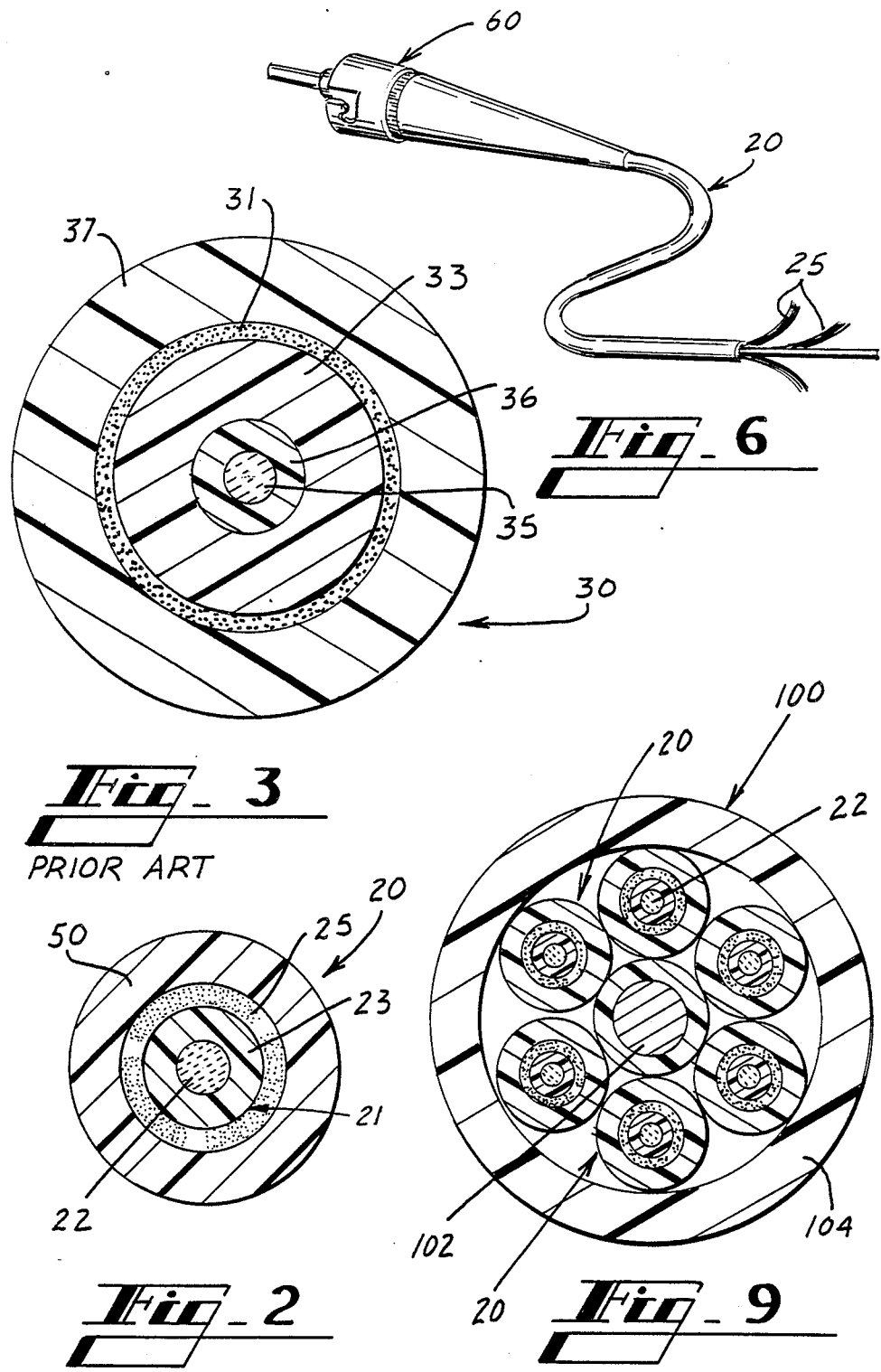

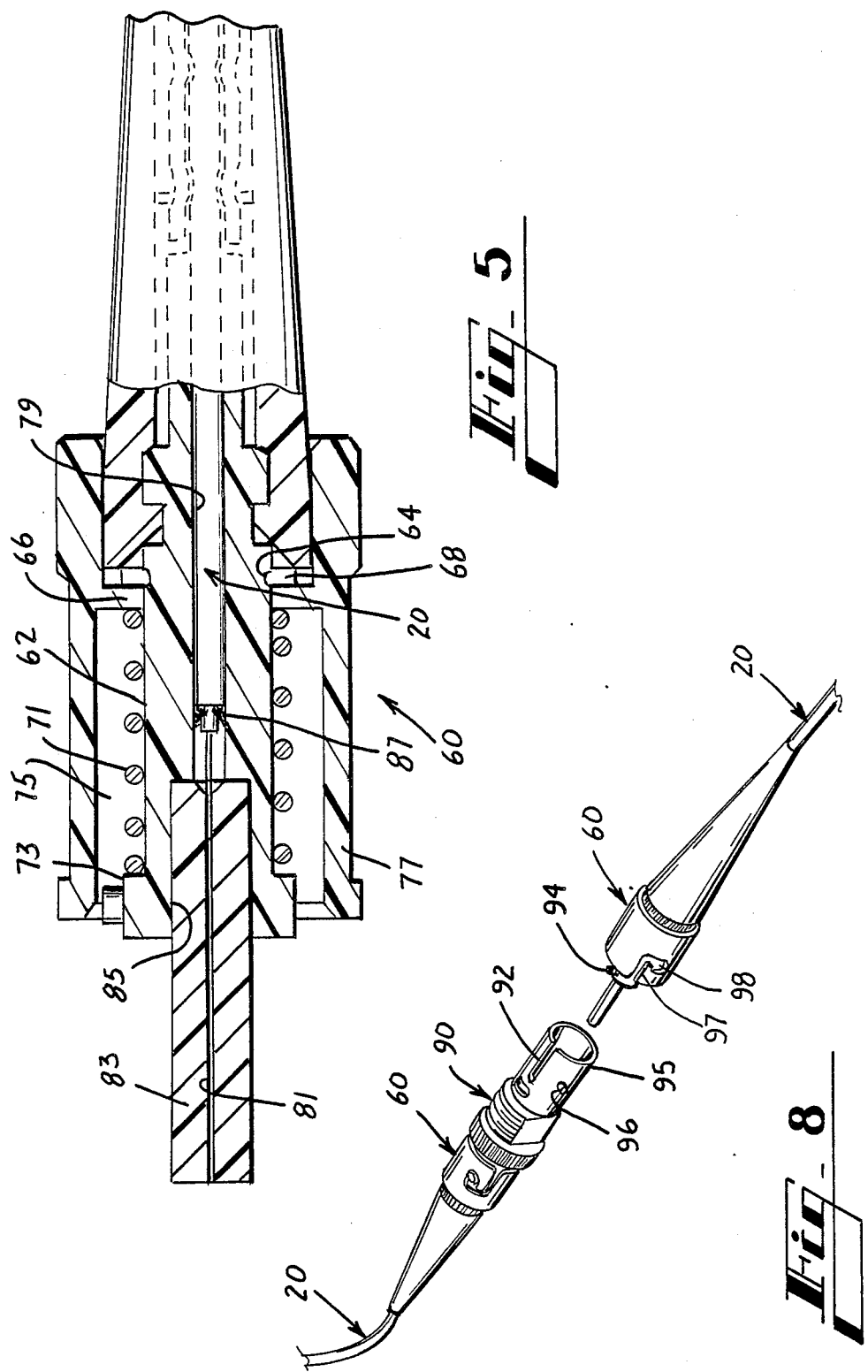

STRENGTHENED BUFFERED OPTICAL FIBER

This application is a continuation-in-part of application Ser. No. 825,709, filed Jan. 31, 1986 (abandoned).

TECHNICAL FIELD

This invention relates to optical fiber transmission media and more particularly to a buffered optical fiber which has an outer diameter that is significantly less than those of the prior art.

BACKGROUND OF INVENTION

An optical fiber cable includes a sheath system which protects an optical fiber which extends along the longitudinal axis of the cable and which serves as an optical communications path. Not only does the sheath system protect the glass fiber, but also it provides the cable with flexibility and with tensile, flexural and impact strength. For multi-fiber cables, the sheath system may include several extruded layers of plastic as well as one or more metallic shields disposed between elements of the sheath system.

Single fiber cables are well known in the art. They may be terminated with biconic connector plugs such as those shown in U.S. Pat. No. 4,512,630 which issued on Apr. 23, 1985 in the name of P. Runge. Such cables are used, for example, in central offices to connect cables to optical transmission apparatus.

Generally, a single fiber cable includes a buffered optical fiber. A buffered optical fiber includes a coated optical fiber which is enclosed in a buffer layer in which the buffer layer engages the coated optical fiber. The buffer layer typically is made of an extruded plastic material such as polyvinyl chloride. Over the buffered optical fiber is a yarn which provides strength for the cable and which is enclosed by a plastic jacket. The yarn may be an aramid fibrous yarn and is usually served in a helical fashion about an advancing buffered optical fiber.

One problem with single fiber cables is the maintenance of concentricity between the fiber and the served yarn, particularly during the manufacturing operation. When it is off-center, the buffered fiber has a tendency to conform to the helical path of the served material which may result in microbending of the optical fiber. Microbending may result in a significant loss in transmission through increased signal attenuation. Also, when concentricity is not maintained, it becomes more difficult to connect the single fiber cable so that the optical fibers are aligned precisely. Concentricity of an optical fiber and its coverings makes handling during manufacturing easier, increases the durability of the product and facilitates more precisely aligned connections.

One solution to this problem is to replace the served yarn with an extruded tube, but this solution is a costly one. Instead, the strength members can be served directly over a heavily buffered fiber. The heavy buffering reduces the tendency for the helical serving to induce microbending in the optical fiber. However, the heavy buffering increases production costs without improving the concentricity of the fiber within the serving.

Another solution to the loss of concentricity during manufacture is to keep the fiber taut during the serving operations. If sufficient tension is placed on the buffered fiber as the serve is being applied, and if this tension is maintained during all subsequent operations, the fiber can be maintained in its center position. However, the tension required to do this would be likely to damage or break the buffered optical fibers. Also, residual tension in the optical fiber after cable manufacture can itself result in higher attenuation and poorer mechanical performance. In U.S. Pat. No. 4,441,787, an optical fiber is maintained concentrically within a textile serve by the use of a highly viscous coating which is applied to the optical fiber. The viscous fluid such as, for example, a colloid, is applied over the coated fiber prior to the serving of the yarn.

Other problems exist in the presently used single fiber cables. One relates to size. Because of the buffering, the cross section of the fiber is relatively large. Increased size cables require more space in central office wiring and more time to remove the coverings to access the optical fiber for connectorization. Also, the stress-strain curve for presently used cables, wherein a plurality of strength member yarn are served or wrapped helically about the buffered optical fiber, includes a knee. This occurs because of the tendency of the cable to elongate somewhat prior to the yarn becoming straightened and loaded by tensile loads imparted to the cable. As a result, the optical fibers enclosed by such yarns are stressed which may result in damage to the optical fiber. Further, it has been found that the single fiber cables are somewhat difficult to strip for connectorization. This is particularly true in those instances where it is desired to expose a substantial length of optical fiber for particular connectorization arrangements.

Further, the buffered optical fiber may be used by itself without being incorporated into a cable structure. In order to provide suitable strength for such an optical fiber, it is not uncommon to enclose it in a layer of a plastic material such as, Hytrel ® plastic, for example, which has greater strength than polyvinyl chloride. Although the use of some other plastic materials provide a solution for the strength problem, they may be somewhat difficult to remove from the optical fiber during connection procedures.

What is needed and what seemingly is not provided by the prior art is a buffered optical fiber which is small in size, and which does not elongate prior to loading of the strength members therein. Further, the sought-after buffered optical fiber should be one in which the engagement of the plastic buffer layer with underlying materials may be varied to meet particular customer requirements. For example, in one use, it is desired that the covering materials may be removed easily to expose the optical fiber for connectorization. Still further, the sought-after cable should be one which overcmes the prior art problem of microbending caused by helically applied yarn and non-concentric fiber covering.

SUMMARY OF THE INVENTION

The foregoing problems have been solved by the buffered optical fiber of this invention. A buffered optical fiber includes an optical fiber having a coating applied to an outer surface thereof. At least one length of fibrous material which functions as a strength member extends along the optical fiber. A buffer layer which is made of plastic material and which encloses the strength member and the optical fiber has a controlled compressive engagement with the at least one length of fibrous material.

In a preferred embodiment, three strands of the fibrous material are disposed about the optical fiber equally spaced in a circumferential direction about its periphery. The fibrous material has unintended stranding to form a strength member which extends in a direction substantially along a longitudinal axis of the fiber. Also, the buffer layer comprises polyvinyl chloride plastic material which is tubed over the optical fiber in a manner to cause the plastic extrudate to have a controlled drawdown on the strength members.

Because of the layless configuration of each of the strength members in the preferred embodiment, loads applied to the buffered fiber or to a cable which includes the buffered fiber are transferred to the strength members immediately. For multifiber cables in which the strength members are applied to each buffered optical fiber with a lay, tensile loads applied to the cable cause elongation of the optical fibers before the strength members become effective to resist the loads. As a result, the buffered optical fiber of this invention or cable which includes the buffered fibers is far less likely to experience damage to the optical fiber than prior art cables in which the strength members are applied with a lay.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view of a buffered optical fiber of this invention;

FIG. 2 is an end sectional view of the buffered optical fiber of FIG. 1;

FIG. 3 is an end sectional view of a prior art single fiber optical cable;

FIG. 5 is an elevational view in section of a connector which may be used to terminate a buffered optical fiber of this invention;

FIG. 6 is a perspective view of an optical fiber of FIG. 1 which has one of its ends terminated with a connector and which has one of its end stripped in preparation for connectorization;

FIG. 7 is a perspective view which shows a buffered optical fiber having each of its ends terminated with a connector of FIG. 5;

FIG. 8 is a perspective view of a connector arrangement in which two buffered optical fibers each being terminated with a connector of FIG. 5 are connected through a coupler;

FIG. 9 is an end view of a multi-buffered optical fiber cable of this invention;

FIG. 10 is a perspective view of a cable of FIG. 9 with each of the optical fibers thereof being terminated with a connector of FIG. 5;

DETAILED DESCRIPTION

Figure 4:
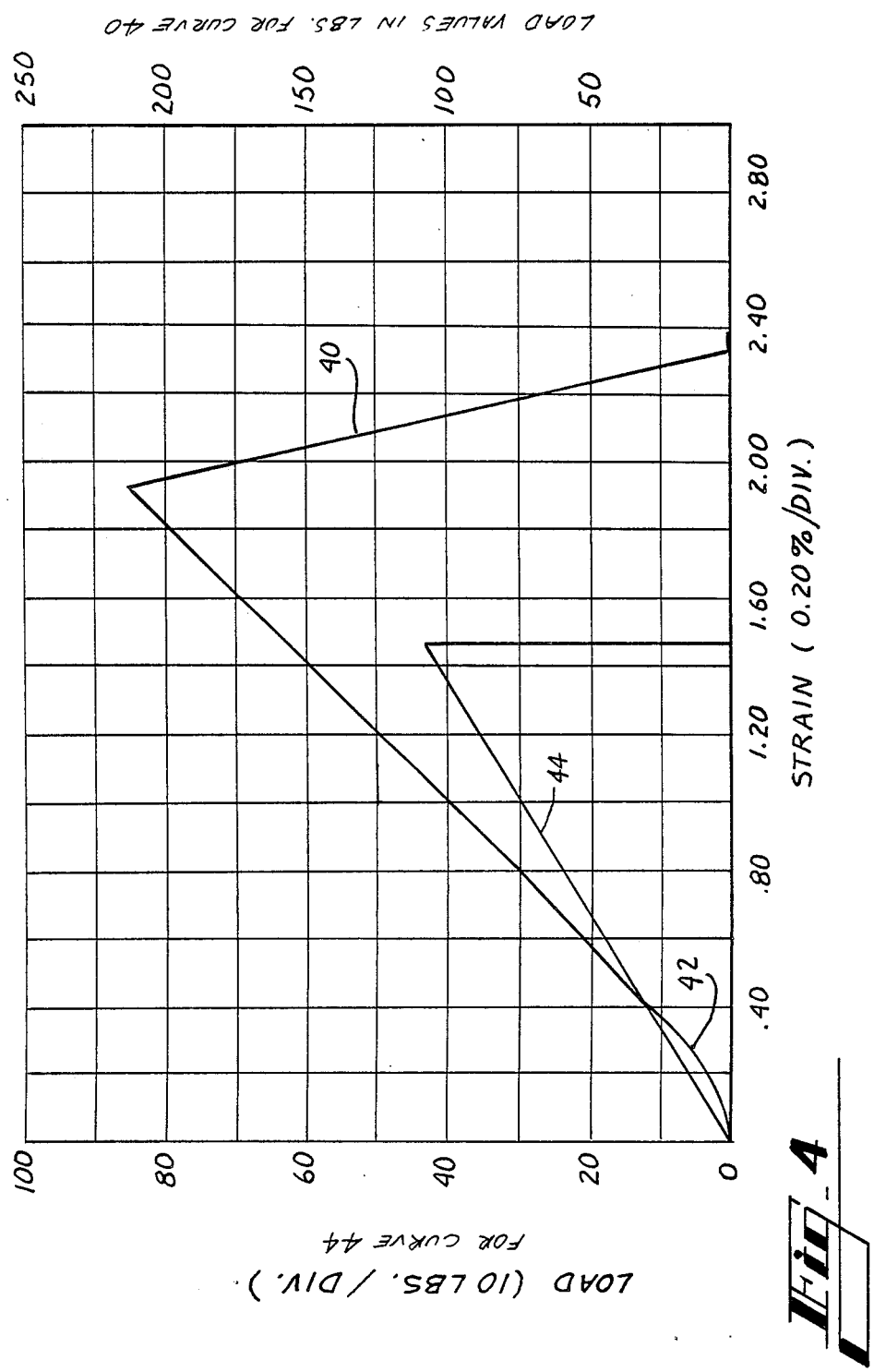
FIG. 4 is a graph which shows the strain associated with tensile loads applied to the buffered optical fiber and cable of FIGS. 1 and 3 respectively.

Referring now to FIGS. 1 and 2, there is shown a buffered optical fiber buffered 20 of this invention. The optical fiber 20 includes an optical fiber 21 which typically includes a core and cladding designated together by the numeral 22 and a UV cured coating 23 about the core and cladding. Of course, the optical fiber 21 may include more than one protective coating. See U.S. Pat. No. 4,474,830 which issued on Oct. 2, 1984, in the name of C. R. Taylor and which is incorporated by reference hereinto. The coated buffered optical fiber has an outer diameter of about 0.010 inch.

In the prior art, a buffered optical fiber has been interpreted to refer to an otical fiber having a protective coating thereabout and enclosed in a buffer layer of plastic which may be polyvinyl chloride (PVC), for example, which engages the coating of the optical fiber. For connection purposes, the industry generally has settled on an outer diameter of 0.035 to 0.039 inch for the buffered optical fiber.

Disposed in engagement with the coated optical fiber 21 is at least one longitudinally extending yarn 25 which serves as a strength member. The yarn is flexible, lightweight and of high tensile and flexural strength so as to provide protection and strength for the optical fiber. In a preferred embodiment, the yarn is a Kevlar ® yarn, which is an aramid fibrous material manufactured by E. I. Dupont de Nemours and Co. (Inc.). KEVLAR is a registered trademark of the E. I. DuPont de Nemours and Co.

Specifically, the strength members are made of Kevlar ® 49 aramid high modulus fiber yarns. Kevlar ® aramid high modulus organic fiber is a fiber having a relatively high tensile strength and relatively high modulus or stiffness. This product is described in Bulletin K-5 which was published by E. I. DuPont de Nemours and Co. (Inc.) in September 1981.

Each of the yarns includes a plurality of filaments 27—27 which are assembled together generally without twist. The denier of each yarn which is the weight in grams of 9000 meters of the material may vary. Denier is an identification system in which the lower numbers represent the finer sizes. Depending on the end use, the cable 20 may include more yarn of less denier or less yarn of larger denier. In the preferred embodiment, three yarns or strands as they are called, each of 380 denier, are disposed about the optical fiber. The three strands are spaced equally circumferentially about the coated optical fiber 21.

The disposition of the strength member yarns 25—25 or strands over the optical fiber 21 itself seemingly is a departure from the prior art. Exemplary of the prior art is the single fiber cable 30 which is depicted in FIG. 3. As can be seen in that figure, yarn 31 is disposed about a buffer layer 33 having a relatively high wall thickness and which encloses an optical fiber 35 having a coating 36. Over the yarn 31 is a plastic jacket 37. This structural arrangement of elements results in an enlarged cross section and also causes problems during connectorization in that it becomes difficult to strip the buffer layer from the optical fiber.

The strength member yarns 25—25 in the buffered optical fiber 20 of this invention may be wrapped helically about the coated optical fiber 21 with a lay or may be substantially layless, that is, substantially without intended stranding. When only one yarn is used, the yarn would most probably be stranded about the coated optical fiber. In the preferred embodiment the yarns 25—25 have a layless configuration. They are applied to an advancing optical fiber such that there is no intended lay in each . This is advantageous during the loading of the cable. During the loading of the cable of FIG. 3, the cable tends to elongate prior to the loading of the yarns. This occurs because the yarns have a lay inasmuch as they are wrapped helically about the buffered optical fiber. Consequently, the yarns tend toward a layless condition before they become loaded and relieve the remainder of the cable from further stress. However, this may be too late to avoid damage to the optical fiber. In the preferred embodiment of this invention, the assumption of the load by the layless yarns under loading of the buffered optical fiber is substantially instantaneous.

This may be further understood by viewing the load-strain curves shown in FIG. 4. A curve 40 having ordinate values along the right side of the graph and being representative of the strain induced in the cable of FIG. 3 includes a knee 42 which appears at a relatively low stress. As a result, the strain in the cable increases at a faster rate than the load is applied. After the knee is passed, the strain is directly proportional to the load. With the buffered optical fiber 20 of this invention, the load is taken up substantially immediately by the strength member yarns. This should be apparent by viewing a curve 44 which has ordinate values along the left side of the graph and which is representative of the strain induced in the preferred embodiment of the buffered optical fiber 20. There, the strain increases at a rate which is linearly proportional to an increase in load. The knee is eliminated and the buffered optical fiber is substantially free of tensile strain. The peak load for the cable 30 is greater than that for the preferred embodiment of this invention because the cable 30 includes more yarn of a higher denier than the buffered optical fiber 20 and includes a jacket in addition to a buffer layer. Of course, the buffered optical fiber 20 may be provided with a greater number of strength member yarns of relatively high denier to increase its peak load capacity.

As can be seen in FIGS. 1 and 2, the buffered fiber 20 also includes buffer layer 50. The jacket 50 is made of a plastic material such as polyvinyl chloride. In the preferred embodiment, the buffer layer 50 has a wall thickness in the range of about 0.006 to 0.008 inch. With the jacket disposed about the yarn and the optical fiber 21, the buffered optical fiber 20 has an outer diameter of about 0.035 inch. This compares to an outer diameter of about 0.1 inch for prior art single fiber cables such as that shown in FIG. 1.

In the manufacture of the buffered optical fiber 20, the outer buffer layer 50 is tubed over the yarn instead of being applied by pressure extrusion. This is accomplished with a controlled drawdown to provide a buffer which has a predetermined compressive engagement with the strength members and which is disposed concentrically thereabout. Suitable changes to the die and/or cable tube of the extrusion apparatus (not shown) are made to maintain the outer diameter of the buffered optical fiber 20 substantially constant. The wall thickness of the jacket varies with the drawdown. The greater the drawdown, the greater the compressive engagement of the plastic buffer layer 50 with the strength members 25—25.

Because of the controlled drawdown, the stripability of the buffer layer 50 of the buffered optical fiber 20 is controlled. In some instances, it is desirable to provide a transition between buffered optical fibers and optical fiber ribbons. In this procedure, as disclosed in U.S. Pat. No. 4,305,642, which issued on Dec. 15, 1981 in the names of L. B. Bloodworth, Jr. et al, a substantial length of covering material is removed to expose the optical fibers. This is done in order to be able to position a plurality of optical fibers on a tape and to enclose them in a second tape to form a ribbon and allow connectorization with an array type connector such as is shown in U.S. Pat. No. 3,864,018 which issued on Feb. 4, 1975, in the name of C. M. Miller.

The stripability is a function of the amount of the drawdown of the plastic buffer layer 50 about the yarn strength members 25—25. The less the drawdown, the easier it becomes to remove the buffer layer 50, particularly from a substantial length of the cable. Of course, there may be instances when it is more desirable to have a substantial compressive engagement of the jacket plastic with the underlying yarn.

The predetermined compressive engagement of the buffer plastic with the underlying strength members 25—25 provides a buffer optical fiber which is capable of being manufactured to suit an end user's requirements. By controlling the drawdown of the outer layer of plastic on the underlying strength members, the stripability of the plastic buffer layer from the optical fiber is controlled. As will be recalled, the outer diameter of the buffered optical fiber is constant. Also, as will be recalled, the number of strength members 25—25 which are disposed between the outer buffer layer and the optical fiber may be varied, typically ranging between one and four. The greater the number of strength members, the thinner is the buffer wall. Furthermore, the greater the compression between the buffer layer and the strength members, which is caused by greater drawdown, the thicker is the wall of the buffer layer.

The buffered optical fiber of this invention is also advantageous from the standpoint of connectorization. Referring now to FIG. 5, there is shown a connector 60 of the type which may be used to terminate the buffered optical fiber 20. An end portion of the buffered optical fiber 20 extends into a terminator 62 having an annular groove 64 on one side of an annular lip 66. A washer 68 disposed about the terminator is received in the groove 64 and engages the lip 66. On the opposite side of the lip 66 is a compression spring 71 which also engages an end flange 73 of the terminator. The spring 71 is disposed within a chamber 75 of a housing 77 of the connector 60.

The terminator 62 includes a passageway 79 in which is received the end portion of the buffered optical fiber 20. The yarn and jacket are removed from an end of the buffered optical fiber to permit an end portion of the optical fiber to be received in a bore 81 of a plug 83. One end of the plug 83 is received in an enlarged cavity 85 of the terminator 62 which communicates with the passageway 79.

As can be seen, an end portion of the buffered optical fiber is stripped to remove the yarn and the buffer layer. The bared portion of the optical fiber extends through the bore 81 of the plug 83. A portion 87 of the yarn is exposed at a location adjcent to the plug 83 and is secured to the wall which defines the passageway 79. This provides strain relief for the buffered optical fiber and specifically for the optical fiber. Inasmuch as the buffer layer and yarn are attached to the connector, strains induced in the connectorized cable are isolated from the optical fiber.

The connector 60 shown in FIG. 5 may be used to terminate one end (see FIG. 6) or both ends (see FIG. 7) of a buffered optical fiber 20. In order to interconnect the optical fibers 21—21 of two buffered optical fibers, the plug 83 of each is caused to be received in a sleeve (not shown) which is disposed in a coupler 90 (see FIG. 8). The coupler 90 is tubular and has a slot 92 formed in each end thereof for receiving a pin 94 which projects radially from the terminator 62. The housing 77 of each connector 60 becomes disposed over an end portion 95 of the coupler 90 and a pin 96 projecting from that end portion is received and locked in a slot 97 of the housing 77. The locking occurs as the pin 96 bottoms out in the slot 97 and the connector is turned to cause the pin to become disposed in a locking portion 98 of the slot 97.

The buffered optical fiber of this invention overcomes the microbending problems of prior art cables which may be caused by a strength member which is helically applied over a non-concentric covering. In the preferred embodiment, the strength member yarns are applied without intended stranding. Also, because the buffered optical fiber includes only a single buffer layer about a coated optical fiber, the probability of the occurence of a non-concentric covering is decreased.

The buffered optical fiber 20 of this invention also may be used to provide a multifiber cable 100 (see FIG. 9). Such a cable includes a centrally disposed strength member 102 which may be metallic, for example, and which may be enclosed in a plastic material. Arranged about the central strength member 102 are a plurality of the buffered optical fibers 20—20. The plurality of buffered optical fibers 20—20 are enclosed by a jacket 104 which is made of a plastic material.

The connector 60 of FIG. 5 also may be used to terminate the cable of FIG. 9. As shown in FIG. 10, a portion of the jacket 106 is removed and each of the single fiber cables which thus become exposed are terminated with a connector 60, for example.

The cable 100 is ideally suited for use in buildings. In the past, these kinds of cables for this use had been manufactured to include a plurality of heavily buffered optical fibers which were not reinforced with strength members. This, of course, reduced the allowable tensile loading of such cables. The cable 100 increases substantially the allowable tensile loading and results in a smaller outer diameter.

The cable 100 as used in buildings is an example of a cable in which a relatively tight engagement of the buffer layer 50 of each buffered optical fiber 20 with its strength members 25—25 is desired. These cables 100—100 must be pulled into and through various passageways in buildings which subjects the cables to tensile loads. The relatively tight compressive engagement of the buffer layer 50 with the underlying strength members 25—25 and hence with the coated optical fiber prevents relative movement between the buffer layer and the coated optical fiber during installation. Also, while the use of the buffered optical fiber 20 to transition through a fanout strip to a ribbon requires a substantial length of buffer layer to be removed, only a relatively small length of buffer layer need to be removed from a buffered optical fiber 20 of a building cable 100 to facilitate connectorization. Accordingly, when the cable 100 is made for particular uses in buildings, the drawdown of the buffer layer 50 is controlled to achieve a relatively tight compressive engagement with the underlying strength members.

Figure 11:
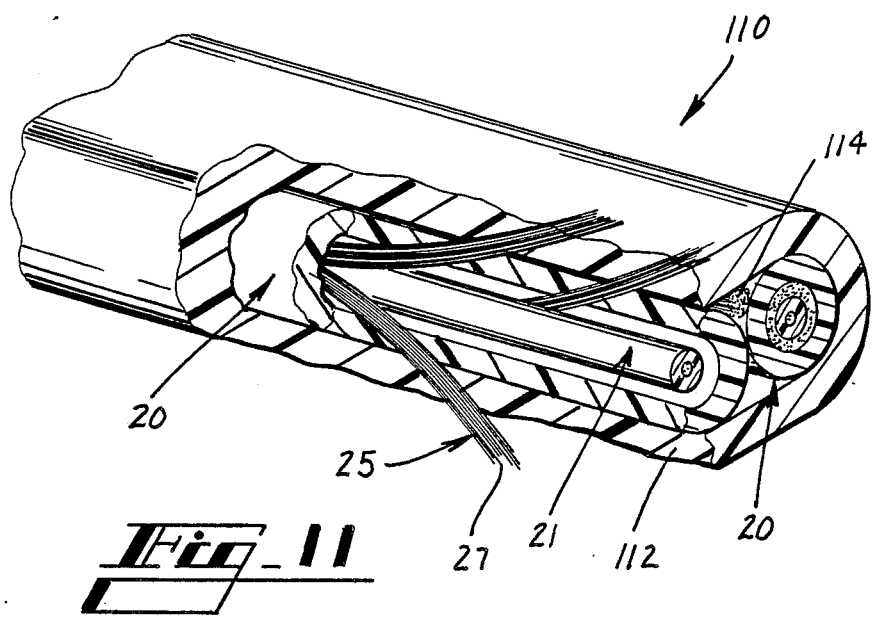
FIG. 11 is a perspective view of a duplex optical fiber cable.
Figure 12:
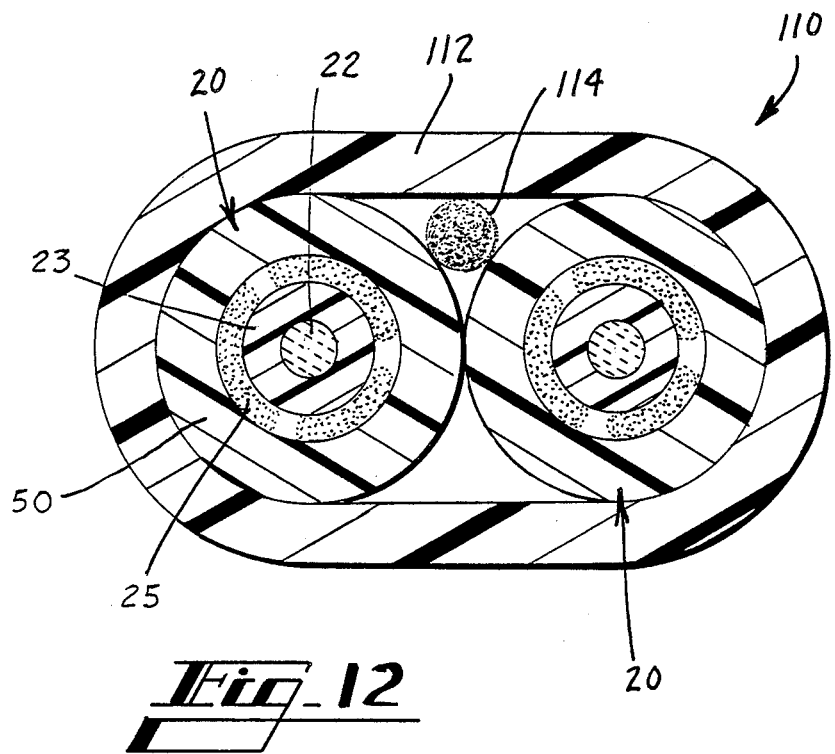
FIG. 12 is an end sectional view of the cable of FIG. 11.

Also included within the scope of this invention is a duplex optical fiber cable 110 (see FIGS. 11 and 12). The cable 110 includes two of the strengthened buffered optical fibers 20—20 which are enclosed in a common outer jacket 112. Typically, the outer jacket has a thickness of about 0.008 inch and is made of a suitable plastic material such as polyvinyl chloride.

The duplex cable 110 shown in FIGS. 11 and 12 also may include facilities which facilitate the removal of the jacket 112 therefrom. To this end, the cable 110 may include a rip cord 114 which is positioned between the two single fiber cables 20—20. The rip cord 114 may be made of a material such as the Kevlar ® yarn. To remove the jacket 112 from a length of the cable 110, a craftsperson begins by pulling on the rip cord 114 to tear a slit in the jacket which allows removal of the jacket from the two buffered optical fibers 20—20.

It is to be understood that the above-described arrangements are simply illustrative of the invention. Other arrangements may be devised by those skilled in the art which will embody the principles of the invention and fall within the spirit and scope thereof.

What is claimed is:

1. A buffered optical fiber, which comprises:
   an optical fiber which includes a silica glass composition optical core, a silica glass composition optical cladding and a protective ultra-violet cured coating which is disposed about said silica glass composition optical core and cladding and which engages said silica glass composition optical cladding and which has an outer diameter of about 300 $\mu$m;
   at least one length of a fibrous strength member which entends along and in engagement with the coating of said optical fiber, said at least one fibrous strength member covering a substantial portion of the periphery of said optical fiber; and
   a buffer layer which encloses and engages said at least one strength member and which is made of a plastic material, said buffer layer having a compressive engagement with said at least one strength member which is controlled to achieve desired strippability of said buffer layer from said cable and to avoid microbending losses when said cable is subjected to a predetermined temperature range.

2. The buffered optical fiber of claim 1, wherein said at least one strength member extends generally linearly and parellel to the longitudinal axis of said optical fiber without intended stranding.

3. The buffered optical fiber of claim 1, wherein said at lest one strength member is stranded about said optical fiber.

4. The buffered optical fiber of claim 1, which includes a plurality of fibrous strength members which are disposed between said optical fiber and said buffer layer.

5. The buffered optical fiber of claim 4, wherein the plurality of strength members are spaced equally circumferentially about said optical fiber.

6. The buffered optical fiber of claim 5, wherein each of said strength members includes a plurality of filaments.

7. The buffered optical fiber of claim 4, wherein said plurality of strength members extend generally linearly and parallel to the longitudinal axis of said optical fiber without intended stranding.

8. The buffered optical fiber of claim 1, wherein an outer diameter of said buffer layer is substantially constant notwithstanding the degree of comprressive engagement of said buffer layer with said at least one strength member.

9. The buffered optical fiber of claim 8, wherein the buffer layer has an outer diameter of about 890 $\mu$m.

10. The buffered optical fiber of claim 1, wherein said buffer layer is disposed about said at least one strength member with the engagement of said buffer layer with said strength member being such as to permit said buffer layer to be removed easily.

11. The buffered optical fiber of claim 1, wherein said buffer layer is in relatively tight compressive engagement with said at least one strength member.

12. The buffered optical fiber of claim 1, which includes a plurality of fibrous strength members which are disposed between said optical fiber and said buffer layer and which are without intended stranding and wherein the application of a tensile load to said buffered optical fiber causes strain of the buffered optical fiber to be substantially linearly proportional to the applied load.

13. The buffered optical fiber of claim 12, wherein each of said strength members is made of an aramid fibrous material.

14. The buffered optical fiber of claim 1, wherein said buffer layer is made of a polyvinyl chloride plastic material.

15. A duplex optical fiber cable, which comprises a pair of buffered optical fibers each of said buffered optical fibers being defined in claim 1, and an outer jacket which is made of a plastic material and which encloses said pair of buffered optical fibers.

16. The duplex optical fiber cable of claim 15, wherein said duplex cable also includes a longitudinally extending strand which is disposed between said outer jacket and the buffered optical fibers and which facilitates removal of said outer jacket from said duplex optical fiber cable.

* * * * *